US008392440B1

(12) United States Patent
Papachristou et al.

(10) Patent No.: US 8,392,440 B1
(45) Date of Patent: *Mar. 5, 2013

(54) ONLINE DE-COMPOUNDING OF QUERY TERMS

(75) Inventors: Dimitra Papachristou, Palo Alto, CA (US); Dan Popovici, Cupertino, CA (US)

(73) Assignee: Google Inc., Mountain View, CA (US)

( * ) Notice: Subject to any disclaimer, the term of this patent is extended or adjusted under 35 U.S.C. 154(b) by 174 days.

This patent is subject to a terminal disclaimer.

(21) Appl. No.: 12/856,495

(22) Filed: Aug. 13, 2010

Related U.S. Application Data

(60) Provisional application No. 61/234,288, filed on Aug. 15, 2009.

(51) Int. Cl.
G06F 7/00 (2006.01)
(52) U.S. Cl. ...................................................... 707/759
(58) Field of Classification Search .................. 707/759, 707/765
See application file for complete search history.

(56) References Cited

U.S. PATENT DOCUMENTS

| 5,283,737 | A | 2/1994 | Van Praag | |
|---|---|---|---|---|
| 6,285,999 | B1 | 9/2001 | Page | |
| 7,610,382 | B1 | 10/2009 | Siegel | |
| 8,041,730 | B1 | 10/2011 | Upstill et al. | |
| 2004/0078190 | A1 | 4/2004 | Fass et al. | |
| 2005/0027691 | A1 | 2/2005 | Brin et al. | |
| 2005/0149499 | A1 | 7/2005 | Franz et al. | |
| 2006/0230022 | A1 | 10/2006 | Bailey et al. | |
| 2008/0059431 | A1* | 3/2008 | Aoki et al. | 707/3 |
| 2008/0071771 | A1 | 3/2008 | Venkataraman et al. | |
| 2008/0109416 | A1* | 5/2008 | Williams | 707/3 |
| 2008/0162399 | A1 | 7/2008 | Tam et al. | |
| 2009/0144248 | A1 | 6/2009 | Treadgold et al. | |
| 2009/0259643 | A1* | 10/2009 | Peng et al. | 707/4 |

* cited by examiner

*Primary Examiner* — Amy Ng
(74) *Attorney, Agent, or Firm* — Fish & Richardson P.C.

(57) ABSTRACT

Methods, systems, and apparatus, including computer programs encoded on computer storage media, for query synonym expansion. One method includes receiving a query including a first compound term, and in response to receiving the query, performing the following operations before search results responsive to the query are identified: generating one or more splits of the first compound term, wherein each split divides the compound term into two or more subterms, assigning a score to each subterm of each split, determining an overall score for each split from the scores for the subterms of the split, selecting one or more of the one or more splits according to the overall score for each split, and augmenting the query with the subterms of each selected split.

47 Claims, 9 Drawing Sheets

| Test 410 | Score 420 | Base 430 | High 440 |
|---|---|---|---|
| frequently_alterable 450 | Ratio of pseudo-queries of a particular type that can be derived from both the original phrase and the synonym<br>= (i)/TDQ | 0.01 | 0.015 |
| frequently_much_in_common 460 | Fraction of user queries for which an altered query has at least three search results in common with the original query<br>= (iv)/(ii) | 0.6 | 0.85 |
| frequently_altered 470 | Fraction of user queries for which the original query is followed by the altered query within a user session<br>= (v)/TDQ | 0.0005 | 0.0015 |
| high_altering_ratio 480 | Fraction of user queries for which the original query is followed by the altered query within a user session divided by the fraction of user queries for which the altered query is followed by the original query within a user session<br>= (v)/(vi) | 1.0 | 3.0 |

FIG. 4

ONLINE DE-COMPOUNDING OF QUERY TERMS

CROSS-REFERENCE TO RELATED APPLICATIONS

This application claims the benefit under 35 U.S.C. §119 (e) of U.S. Provisional Patent Application No. 61/234,288, titled "ONLINE DE-COMPOUNDING OF QUERY TERMS," filed Aug. 15, 2009, which is incorporated here by reference.

BACKGROUND

This application relates generally to the field of information retrieval, and more specifically to the problem of retrieving answers to search queries and to assisting users in revising search queries.

The World Wide Web (web) contains a vast amount of freely available information. However, locating a relevant item of information on the web can be a challenging task. Note that this problem continues to increase as the amount of information available on the web continues to grow.

Search engines can often help users to locate and retrieve a document of interest on the web. However, users often fail to select effective query terms during the searching process. For example, a user may enter the query [web hosting+fort Wayne] when the city of Fort Wayne is usually referred to as Ft. Wayne. Or, a user may enter [free loops for flash movie] when most relevant pages use the term "music," rather than "loops" and the term "animation" rather than "movie." Thus, documents that satisfy a user's informational needs may use different terms than the specific query terms chosen by the user to express a concept of interest. Note that this problem becomes more of an issue as the number of terms in a query increases. For queries longer than three or four words, there is a strong likelihood that at least one of the terms is not the best term to describe the user's informational need.

Hence, there is a need to modify and/or expand user queries to include synonyms for query terms, so that retrieved documents will better meet the user's informational needs.

Unfortunately, solving this problem has proven to be a difficult task. A simple approach is to use pre-constructed synonym information, for example from a thesaurus or a structured lexical database. However, thesaurus based systems have various problems. For example, they are often expensive to construct, and are generally restricted to one language.

A more significant issue is that the applicability of a synonym to a given phrase often strongly depends on the context in which the phrase is used. For example, the term "music" is not usually a good synonym for the term "loops," but it is a good synonym in the context of the example above. However, the context in the example above is sufficiently uncommon that the term "music" is not listed as a synonym for the term "loop" in standard thesauruses. Note that many other examples of contextually dependent non-traditional synonyms can be identified. Hence, even if conventional synonyms can be identified for a term, it may be difficult to identify specific synonyms to use in the context of a specific query.

Other conventional approaches cluster "related words." Such approaches suffer from the drawback that related words are not necessarily synonyms. For example, the words "sail" and "wind" would likely be clustered (because they co-occur in numerous documents); however they are not synonymous. Hence, substituting one for the other is likely to lead to undesirable search results.

Accordingly, what is needed is a method and an apparatus that identifies potential synonyms, and also identifies contexts in which they are applicable.

BRIEF DESCRIPTION OF THE FIGURES

FIG. 4 presents a table illustrating several tests that may be used to qualify the quality or strength of a candidate synonym according to one embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims. The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Crawling Ranking and Searching Processes

Figure 1:
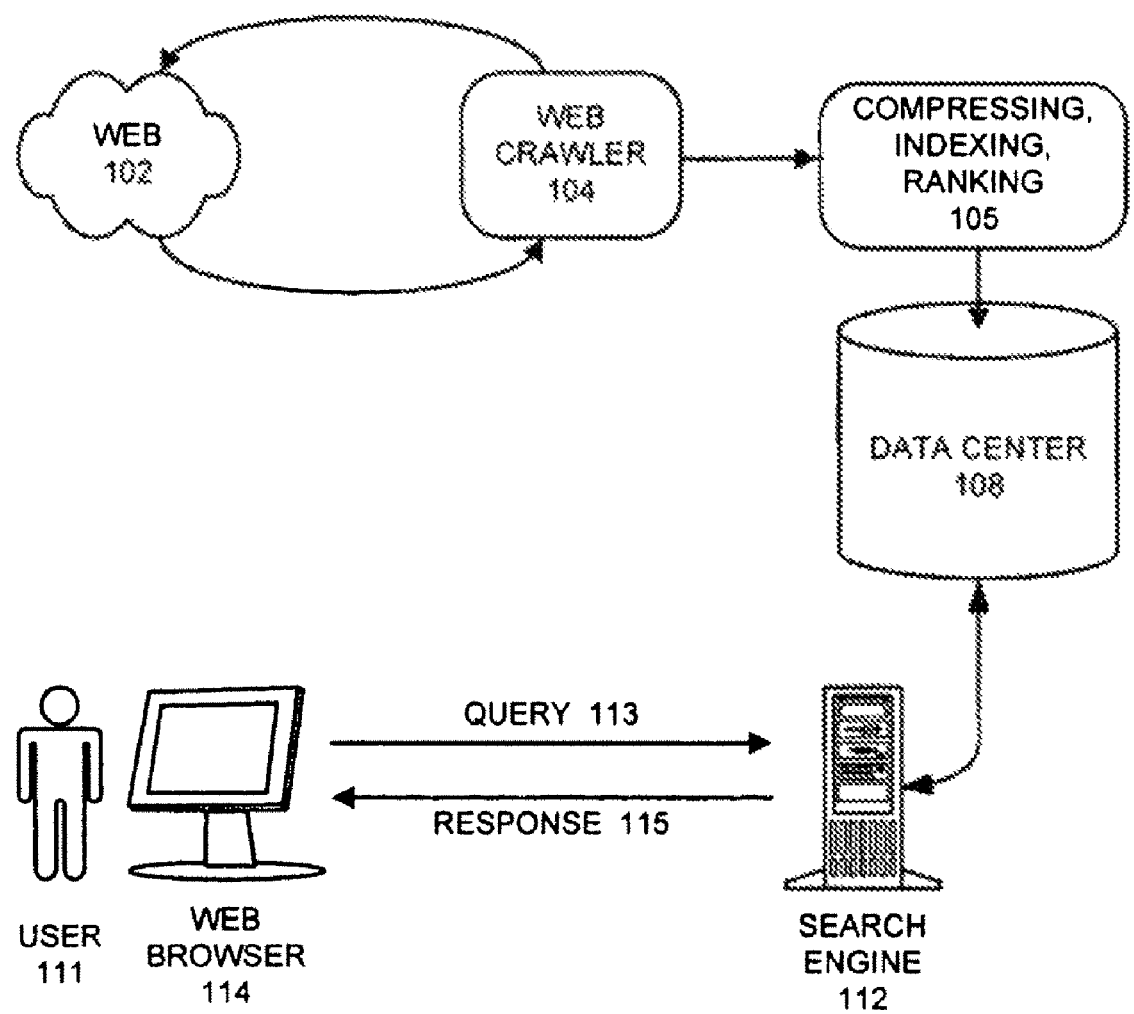
FIG. 1 illustrates the crawling, ranking and searching processes in accordance with an embodiment of the present invention.

FIG. 1 illustrates the crawling, ranking and searching processes in accordance with an embodiment of the present invention. During the crawling process, a web crawler 104 crawls or otherwise searches through websites on web 2 to select web pages to be stored in indexed form in data center 108. The selected web pages are then compressed, indexed and ranked in module 105 (using the ranking process described above) before being stored in data center 108.

During a subsequent search process, a search engine 112 receives a query 113 from a user 111 through a web browser 114. This query 113 specifies a number of terms to be searched for in the set of documents. In response to query 113, search engine 112 uses search terms specified in the query as well as synonyms for search terms to identify highly-ranked documents that satisfy the query. Search engine 112 then returns a response 115 through web browser 114, wherein the response 115 contains matching pages along with ranking information and references to the identified documents.

Synonyms

Figure 2A:
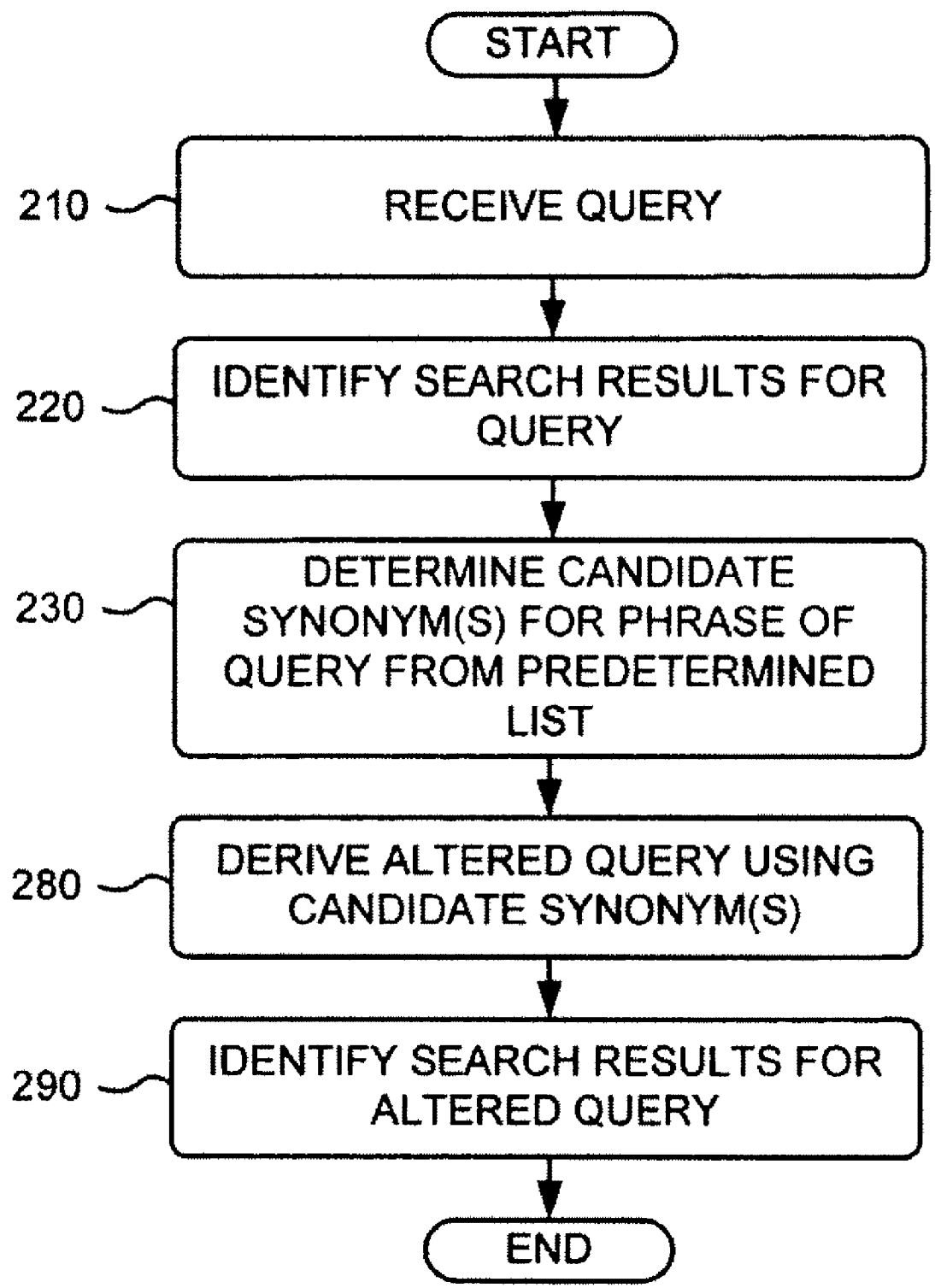
FIG. 2A presents a flowchart illustrating a method of providing altered queries according to one embodiment of the present invention.

FIG. 2A is a flowchart illustrating a method for altering queries to incorporate synonyms in accordance with an embodiment of the present invention. Initially, a search query is received from a client 110. In one embodiment, a front-end server is responsible for receiving the search query from the client (step 210). This front-end server provides the query to the search engine, which evaluates the query. In addition, the front-end server and/or search engine maintains various log files or lookup tables that storing each received query, as well as other information. More particularly, each query can be stored with a user identifier that identifies the particular browser and/or computer from which the query was received, a timestamp for the query, and a list of some number of the search results (e.g., a list of the top ten document IDs from the search). Other information related to user context or the search itself may also be stored. The log files and lookup tables are maintained in anonymized form to protect user privacy. This does not affect the operations of the system.

Next, a list of search results for the search query is identified (step 220). In this example, the search engine evaluates the query to retrieve a set of search results in accordance with the search query and returns the results to the front-end server. The search engine communicates with one or more content servers to select documents that are relevant to the user's search query. (Note that a content server stores a large number of indexed documents, indexed (and/or retrieved) from different websites.) Alternately, or in addition, the content server can store an index of documents stored on various websites. "Documents" are understood here to be any form of indexable content, including textual documents, images, video, audio, multimedia, presentations, and so forth.

In one embodiment, each indexed document is assigned a page rank according to the document's link structure. This page rank serves as a query-independent measure of the document's importance. An exemplary form of page rank is described in U.S. Pat. No. 6,285,999. The search engine assigns a score to each document based on the document's page rank (and/or other query-independent measure of the document's importance), as well as one or more query-dependent signals of the document's importance (e.g., the location and frequency of search terms in the document).

Then, one or more synonymous terms associated with a context of the search query are identified (step 230) from a predetermined list. Formation of the predetermined list may be accomplished using various processes.

Figure 2B:
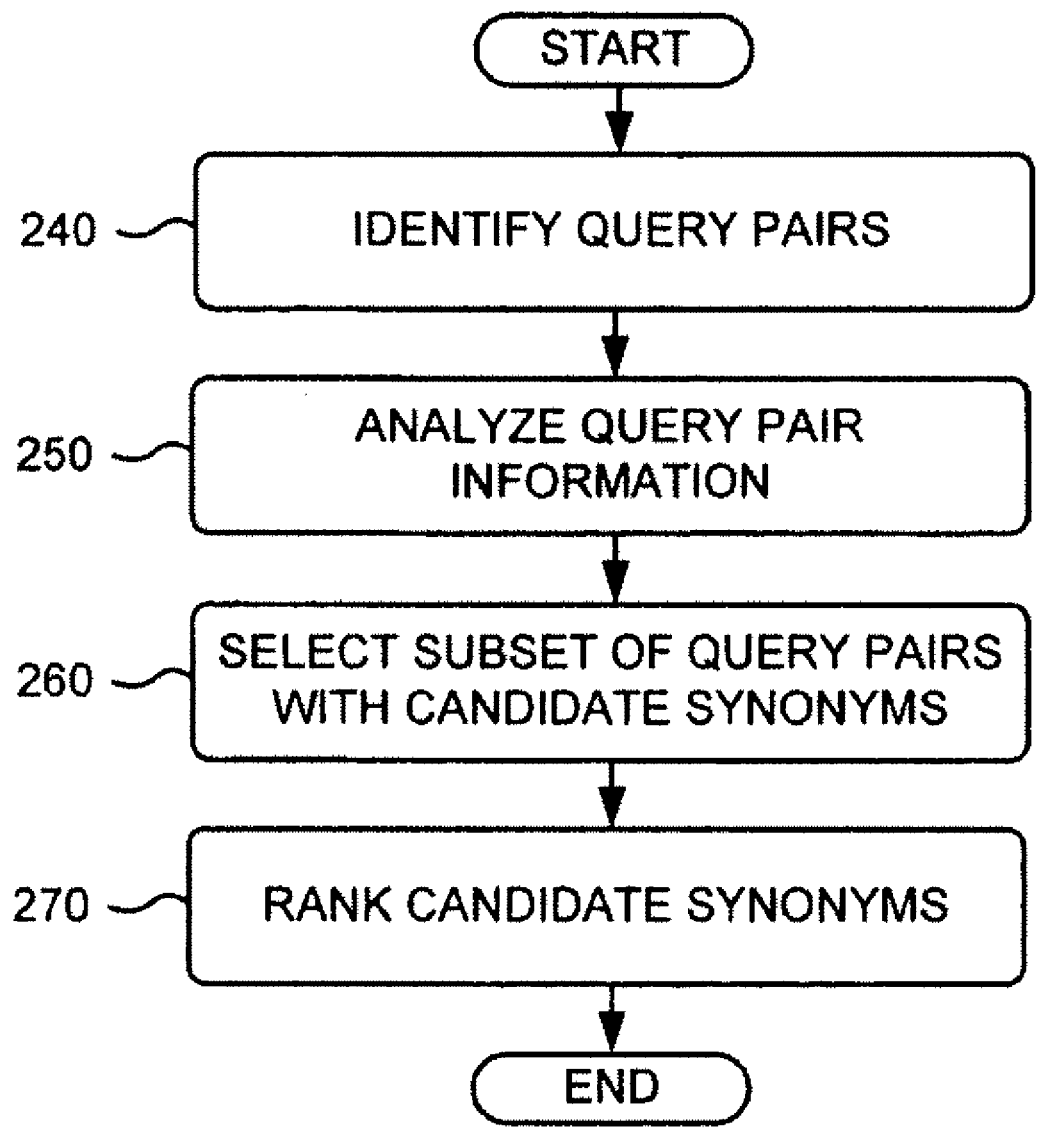
FIG. 2B presents a flowchart illustrating a process for determining one or more synonymous terms in a context of the user search query according to one embodiment of the present invention.

More specifically, FIG. 2B is a flowchart illustrating a process for determining one or more synonymous terms in the context of a search query according to one embodiment of the present invention.

First, query pairs are identified (step 240). An example of this process is further described in conjunction with FIG. 3. In one embodiment, this is accomplished by analyzing user query logs and lookup tables. The set of all queries received over some period are reviewed and all original and altered query pairs are identified. An altered query is defined as a query obtained by replacing a phrase in the original user query with a candidate synonym. A "phrase," in the context of the present invention is one or more individual words or terms. For example, an original user query might be [free loops for flash movie], and the altered query might be [free music for flash movie]. In addition, certain queries may be eliminated as having insufficient context. For example, queries used in the analysis may be required to have at least three terms. To facilitate identification of query pairs, possible query fragments, or "pseudo-queries," are formed by removing phrases from the query and replacing each phrase with a token (e.g., ":") that acts as a variable. Then, queries that vary only by the phrase marked with the token are identified as query pairs.

Next, information about the query pairs is analyzed (step 250). For each query pair, additional information to suggest that the phrase in the original query and altered query are synonymous is identified. For example, the evidence may include the frequency with which both queries in the pair are entered by the same user within a short time interval, or the number of top results that the original query and altered query share.

To further ensure that candidates are effectively synonymous, one or more additional tests can be used. One such test is to determine whether for every query containing the phrase A, the corresponding query with the phrase B substituted for A has a moderately high probability of occurrence in the stored data. In one embodiment of the present invention, the required probability is 1%.

A second test is that, for every query containing A, the corresponding query with B substituted for A has a minimum probability of being entered by the same user in a short time interval. In one embodiment, the interval is an hour and the probability is 0.1% or greater.

A third test is that, for every query containing A, if the corresponding query with B substituted for A occurs, the two queries have a minimum probability of having a number of the top results in common. In one embodiment, the probability is 60-70% and the number of results in common is 1-3. These tests are described further in conjunction with FIG. 4.

These tests can also be performed for subsets of query pairs in which the phrases appear in a particular context of adjacent words. For example, in the query pair [killer whale free photos] and [killer whale download photos], the candidate synonym pair "free," "download" appears in the context of following "whale," which can be indicated as (whale :), in the context of preceding "photos," which can be indicated as (: photos), in the context of between "whale" and "photos," which can be indicated as (whale: photos) and in the general context, which can be indicated as the token alone (:).

For each phrase, such as "free" above, and for each candidate synonym, such as "download" above, the statistics used for the above tests can be gathered for each of the most common contexts in which the phrase occurs. In this example, the query would be reflected in statistics for all occurrences of "free," the general context (:); for only occurrences of "free" following "whale," the context (whale :); for only occurrences of "free" preceding "photos," the context (: photos); and for only occurrences of "free" between "whale" and "photos," the context (whale : photos). Since many queries containing the phrase "free" are processed, statistics will be obtained for many contexts in which "free" has occurred, quite possibly many thousands of different contexts.

For each phrase such as "free" above, and for each candidate synonym, such as "download" above, the above tests are performed for the overall context, to determine whether the substitution is generally a good one. For example, it may be determined that "download" is not generally (i.e., in the general context) a good synonym for "free," is a good synonym in the context (: photos), and is not a good synonym in the context (: press). The conclusion in this example is that the context (: photos) is an exception to the general rule that "download" is not a good synonym for "free."

From the query pairs, a subset is selected (step 260) including phrases with candidate synonyms that meet certain criteria. In one embodiment, the criteria are some or all of the tests discussed above in the general context. In another embodiment, a number of top candidate synonyms are selected for the subset of query pairs. A synonym can be considered more significant than other synonyms, for example, if it is used in an altered query more often within user sessions, or if its altered query yields more search results in common with the original query.

Next, candidate synonyms are ranked (step 270), or qualified, using the criteria discussed above. Initially, a set of threshold conditions should be satisfied using the data gathered above as is discussed in greater detail in conjunction with FIG. 4. In one embodiment, the conditions may specify that for at least 65% of the original-altered query pairs, there is at least one search result in common and that the frequency with which the altered query follows (e.g., occurs within five sequential queries) the original query within a user session is at least 1 in 2000. Then, the statistics from step 250 are evaluated using a float scale function to determine a score for each qualified synonym, as discussed in greater detail in conjunction with FIG. 3. This score is a measure of the confidence in a qualified synonym. Depending on the application, greater or lesser confidence or strength will be required. Consequently, whether a qualified synonym is declared a useful synonym depends on the threshold value of evidence that is sufficient for the application.

Referring again to FIG. 2A, following identification in step 230 of synonymous terms, one or more altered queries are derived (step 280). Various methods exist for deriving alternative queries from the synonymous terms. One such method is disclosed in U.S. patent application Ser. No. 10/629,479, filed on Jul. 28, 2003, entitled "System and Method for Providing a User Interface with Search Query Broadening," which is incorporated herein by reference. In one embodiment, alternate queries are suggested that include the synonym, either as a substitution in or an addition to the query. In another embodiment, for example, when a user enters a given query, a number of alternative queries can be provided back to the user, along with the search results for the original query according to various methods. One such method is disclosed in U.S. application Ser. No. 11/094,814 filed on Mar. 29, 2005, entitled "Integration of Multiple Query Revision Models," which is incorporated herein by reference.

In another embodiment, the synonym is treated as equivalent to the original phrase automatically for purposes of document retrieval. For example, the original query can be modified by replacing the phrase with a synonym or a disjunction of the original phrase and a synonym when producing search results for the query.

From the above steps, a list of altered search results for the altered query is identified (step 290). In one embodiment, this list may include a maximum number of results.

Figure 3:
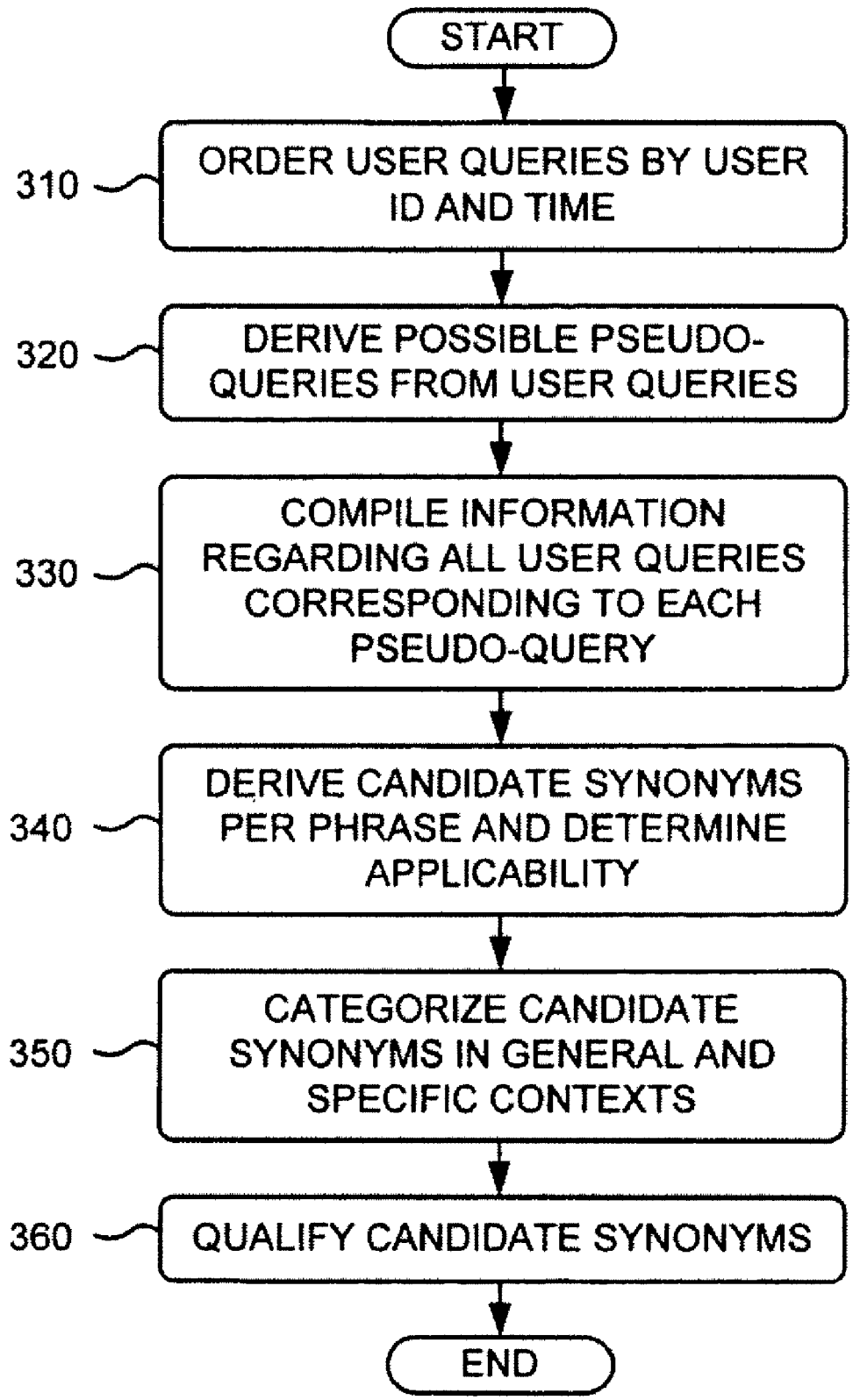
FIG. 3 illustrates an exemplary method for determining candidate synonyms for search query terms according to one embodiment of the present invention.

FIG. 3 depicts an example method of determining candidate synonyms for search query terms according to one embodiment of the invention. The method operates in the context of an information retrieval system, which generally includes a front-end server, a search engine, and an associated content server. During operation, users access the system through a conventional client over a network operating on any type of client computing device, for example, by executing a browser application or other application adapted to communicate over Internet-related protocols (e.g., TCP/IP and HTTP). The information retrieval system can operate on high performance server class computers, and the client device can be any type of computing device. The details of the hardware aspects of server and client computers are well known to those of skill in the art and thus are not further described here.

The front-end server starts by receiving a search query submitted by the client. Next, the front-end server provides the query to the search engine, which evaluates the query to retrieve a set of corresponding search results, and returns the search results to the front-end server. Next, the search engine communicates with one or more of the content servers to select documents that are relevant to the user's search query. Note that a content server stores a large number of documents, which are indexed (and/or retrieved) from different websites. Alternately, or in addition, the content server can store an index of documents stored on various websites.

The term "document" as used in this specification and appended claims refers to be any form of indexable content, including textual documents in any text or graphics format, images, video, audio, multimedia, presentations, web pages (which can include embedded hyperlinks and other metadata, and/or programs, e.g., in JavaScript), etc. In one embodiment of the present invention, each indexed document is assigned a page rank according to the document's link structure. The page rank serves as a query-independent measure of the document's importance. An exemplary form of page rank is described in U.S. Pat. No. 6,285,999. The search engine assigns a score to each document based on the document's page rank (and/or other query-independent measure of the document's importance), as well as one or more query-dependent signals indicating the document's importance (e.g., the location and frequency of search terms in the document).

The front-end server and/or search engine maintains various log files that store each received user query, in association with other information. More particularly, each query is stored with a user identifier that identifies the particular browser and/or computer from which the query was received, a timestamp, and, for some queries, a list of some number of the search results (e.g., a list of the top ten document IDs from the search). The log files are maintained in anonymized form to protect user privacy. This does not affect the operations of the system. Other information, contextual of the user, the search, or the like may also be stored. The information in the log files is then analyzed according to the methods described herein.

First, all queries received over a period of time, such as a week, are sorted (step 310) by user ID (e.g., by cookie), and then by time. The user IDs are anonymized to protect user privacy. This organizes the queries into individual user sessions, where a session is defined as queries from an individual client device (or user) occurring with a given time interval, for example one hour (though longer or shorter definitions of a session may be used, as desired). Assume that within a one hour window from one user, the following queries were logged from an individual client device:

[gm cars]
[gm new car prices]
[gm used car prices]
[general motors used car prices]

First, certain queries are eliminated as having insufficient context; preferably queries used in the analysis have at least three terms. Thus, in the forgoing example, the query [gm cars] is eliminated.

For each remaining query, all possible query fragments or pseudoqueries, are formed (step 320) by replacing a sequence of one or more terms with a marker or token (e.g., ":"), while leaving at least two words in the pseudoqueries. For the query [gm used car prices], the pseudo-queries are:

[: used car prices]
[gm: car prices]
[gm used: prices]
[gm used car:]
[: car prices]
[gm: prices]
[gm used:]

The generation of pseudo-queries may be described as iteratively replacing each term (or sequence of consecutive terms) of a query with a universal token. The term (or sequence of terms) that is replaced is called a "phrase."

Records are created for each pseudo-query of each query in session (step 330), which will be used to collect contextual information for the pseudoqueries, derive statistical information about term substitution, usage, and search result commonality. Each pseudo-query record is keyed by its pseudo-query, the original query from which it was derived, and the phrase that was replaced by the token to produce the pseudo-query. The keying of the pseudo-query records in this manner allows for multiple different sorts and aggregations of the pseudoquery records as further described below. Step 330 also optionally annotates a pseudo-query record with the first ten resultant document IDS (indicated below as "url#") returned by the search engine in response to the query, either extracted from the log files (if available), or indirectly with a pointer or other reference to an external store of the results. According to one embodiment, fewer or no document IDS may be annotated, to reduce the required storage space.

If two or more user queries in a session have pseudo-queries in common, more than one record will be created that is keyed with the same pseudo-query, but the records will differ in their original user queries. In addition, if the related user queries occurred within five queries of each other, a sub-record is added to each record indicating that there was a related query in the same session. In addition, the sub-record notes the phrase that the related query had in place of the corresponding phrase in this query, and whether the related query occurred before or after the other query of the data record.

For the above example user session, one data record produced for [gm used car prices] would be
{pseudo-query: [gm: car prices],
original-query: [gm; used car prices],
phrase: used,
related-phrases: <{phrase: new, before: yes, after: no}>
top-results: <url370293847, url1123985709, . . . >
}
Another data record would be
{pseudo-query: [: used car prices],
original-query: [gm used car prices],
phrase: gm,
related phrases: <{phrase: general motors, before: no, after: yes)>
top_results: <url370293847, url1123985709, . . . >
}

Note that in these examples pseudo-query records, the field delimiters (e.g., "pseudo-query:") are explicitly shown for illustrative purposes only, and in practice, would not be present in the actual records themselves. In addition, in these examples "related phrases" are phrases that may be classified as candidate synonyms.

One of the data records produced for the query [gm new car prices] would have the same pseudo-query as the first record above:
{pseudo-query: [gm: car prices],
original-query: [gm new car prices],
phrase: new,
related-phrases: <{phrase: used, before: no, after: yes}>
top_results: <url11123985709, url1093475987, . . . >
}

Similarly, one of the data records produced for the query [general motors used car prices] would have the same pseudo-query as the second record above:
{pseudo-query: [: used car prices],
original-query: [general motors new car prices],
phrase: general motors,
related-phrases: <{phrase: gm, before: yes, after: no}>
top-results: <url1370293847, url1123985709, . . . >
}

The process of generating the pseudo-queries operates to make explicit the range of potential contexts of each phrase that is implicit within each query. The records corresponding to an individual pseudo-query reflect what is known (i.e., across all user queries in the logs) about one set of queries that differ in only one phrase.

The records for each pseudo-query are then analyzed (step 340) to generate a new set of records that reflect how well each phrase appears to function as a synonym for some other phrase, if it occurs in the given pseudo-query. Pseudo-query records are sorted by pseudo-query such that all records with the same pseudo-query are grouped together. For example, assume that the records for the pseudo-query [: used car prices] include the two from above, plus two more, all of which are shown below:
{pseudo-query: [: used car prices],
original-query: [gm used car prices],
phrase: gm,
related-phrases: <{phrase: general motors, before: no, after: yes}>
top-results: <url1370293847, url1123985709, . . . >
}
{pseudo-query: [: used car prices],
original-query: [general motors new car prices],
phrase: general motors,
related phrases: <{phrase: gm, before: yes, after: no}>
top_results: <url1370293847, url1123985709, . . . >
}
{pseudo-query: [: used car prices],
original-query: [ford used car prices],
phrase: ford,
related-phrases: < >
top_results: <url1283923887, url1739572390, . . . >
}
{pseudo-query: [: used car prices],
original-query: [gm used car prices],
phrase: gm, related-phrases: < >
top_results: <url1370293847, url1123985709, . . . >
}

Thus, there is another query, [ford used car prices], as well as another instance of the query [gm used car prices] from elsewhere in the logs. Step 340 generates a single record for each phrase that is identified in a pseudo-query. In other words, all records with the same pseudo-query are grouped together and a new record is created for each phrase covered by the group, reflecting how that phrase relates to the other phrases of the group for that pseudoquery. Continuing the present example, step 340 creates a record for each of the phrases "gm," "general motors" and "ford." Each record includes candidate synonyms for the respective phrase.

Each record output by step 340 identifies the ten most significant potential synonyms for each phrase. The significance of synonyms is determined at this stage independent of context according to a hierarchy of tests. First, a synonym that occurs in more related queries within sessions is considered more significant than one that appears in fewer related queries. Second, if two synonyms occur in the same number of related queries within sessions (as is likely to be the case, since relatively few sessions have related queries), a synonym is considered more significant than another if the results returned for a search query that includes the first synonym have more results in common with the results returned for a query with the phrase. Finally, if two synonyms still evaluate as equally significant, one is considered more significant if it occurs more often within the queries corresponding to the respective pseudo-query.

As this example shows, even though a query may appear in several data records, as does [gm used car prices], the query is not weighted more heavily because it appears in more records. This aspect of the calculation is based on empirical evidence that it is more meaningful to examine many distinct queries than to simply count multiple occurrences of a given query.

Continuing with the present example, for the phrase "gm," and the pseudo-query [:used car prices], step 340 would output:
{phrase: gm,
  original-query: [gm used car prices],
  related phrases: <{phrase: general motors, common_urls: 5,
    before: no, after: yes},
  {phrase: ford, common_urls: 0, before: no, after: no}>
}

As illustrated, step 340 passes on the session information from step 330. For example, the data record above reflects the session queries "gm used car prices," "general motors used car prices," and "ford used car prices." In many cases, like "ford" in this example, there the original and altered queries may occur in different sessions, yet not occur together in a single session. Step 340 also compares the search results (using, e.g., the document IDS) for each original and altered query if they were recorded, and tracks how many were in common. Thus, in the present example, [gm used car prices] and [general motors used car prices] had 5 documents in common among their respective top ten, while the results for [gm used car prices] had no documents in common with those for [ford used car prices]. Then, the records produced by this step are sorted by phrase, gathering together all records produced by step 340 for each phrase.

For each phrase, step 350 computes statistics that reflect how well each candidate synonym functions as a synonym in general (i.e., in the general context, ":"), as well as in specific contexts. In the examples at this level of the analysis, candidate synonyms are selected from the observed "related phrases." Continuing the present example, assume that for the phrase "gm," step 350 receives the above record, plus two more:
{phrase: gm,
  original-query: [gm used car prices],
  related-phrases: <{phrase: general motors, common_urls: 5,
    before: no, after: yes},
  {phrase: ford, common_urls: 0, before: no, after: no}>
}
{phrase: gm,
  original-query: [gm new car prices],
  related-phrases: <{phrase: general motors, common_urls: 4,
    before: no, after: no},
  {phrase: 2005, common_urls: 0, before:no, after: no},
  {phrase: best, common_urls: 1, before:no, after: no}>
}
{phrase: gm,
  original-query: [nutrition of gm food],
  related-phrases: <{phrase: genetically modified, common_urls: 6, before: no, after: yes},
  {phrase: macdonalds, common_urls: 0, before: no, after: no)>}
}

Step 350 determines how many queries contained a particular phrase and computes statistics for each candidate synonym of the phrase. In one embodiment, this includes determining the number of queries for which the corresponding query with the synonym:
  (i) existed (i.e., appeared in the logs);
  (ii) existed and there was result data for both the original and altered queries, so that common results were computed;
  (iii) existed and had at least 3 results in common;
  (iv) existed and had at least 1 result in common;
  (v) appeared earlier within a session; and
  (vi) appeared later within a session.

In this example, for the phrase "gm," and the candidate synonym "general motors," the statistical data is:
  (i) existed (i.e., appeared in the logs): 2;
  (ii) existed and there was result data for both the original and altered queries, so that common results were computed: 2;
  (iii) existed and had at least 3 results in common: 2;
  (iv) existed and had at least 1 result in common: 2;
  (v) appeared earlier within a session: 0; and
  (vi) appeared later within a session: 1.

This data is strongly suggestive that "general motors" is a good synonym for "gm," although, in practice, statistics should be gathered over queries including the phrase "gm" in order to have confidence in the statistics.

In addition to evaluating these statistics for each synonym in the general context, step 350 also gathers statistics for each context in which the phrase occurs frequently. For example, statistics are gathered for the 10,000 contexts for which the most queries exist. In this example, the contexts would be (:), (: used), (: used car), (: new), (: new car), (of :), (nutrition of :), (: food), and (of: food). Only one of the queries discussed in the above example (original queries [gm used car prices], gm new car prices], and nutrition of gm food]) belongs to each of these specialized contexts, except the general context, (:), which subsumes all three queries. Realistically, however, some contexts will include data from many queries. Step 350 evaluates the above statistics for each context, retaining; for each context, only the 20 most common candidate synonyms.

Step 360 further qualifies candidate synonyms using various tests. FIG. 4 is a table illustrating several tests that may be used to qualify the quality or strength of a candidate synonym according to one embodiment of the present invention. The tests 410 apply to statistics gathered in step 350.

The qualification begins by confirming that two preliminary conditions are satisfied. The first preliminary condition is that for at least 65% of the original-altered query pairs, there is at least one search result (e.g., a URL) in common. The 65% parameter is empirically derived, and other thresholds can be used as well, depending on the corpus of documents. The second preliminary condition is that for at least 1 in 2000 of the query pairs, a user in a session enters the original query followed by the altered query within, e.g., five queries.

If both preliminary conditions are satisfied, step 360 evaluates a number of the statistics from step 350 as a group, according weight to each statistic. The evaluation can be based on the following action:

float Scale (float score, float base, float high) {
float x=(score-base)/(high-base);
float y=(x-sqrt(x*x+4.0))/2.0;
return 1.0+y;
} where score 420 (ratio the test determines), base 430 (target value), and high (scaling factor) taken from the tests 410 of FIG. 4, which are described in greater detail below.

A series of tests 410 shown in FIG. 4 that apply the function Scale to the data evaluated in step 350. The function Scale is defined such that the value returned should be 0 when score=base, should asymptotically approach 1 when score 420 is large positive, and should be about equal to (score-base)/(high-base) when score 420 is large negative. The value of base 430 reflects a desired value for the given test. The individual tests are defined as follows.

frequently_alterable 450 provides a measure of whether, for each query with the phrase of interest, the corresponding altered query occurs often enough (preferable more than 1%) to suggest that the candidate synonym makes sense in context. This computation is (i) from step 350 (queries in log) over the total number of distinct queries including the phrase (TDQ).

frequently_much_in_common 460 evaluates whether the original queries and altered queries typically exhibit enough results in common to suggest that the meanings of the phrase and candidate synonym are similar. Preferably, at least 60% of altered queries have at least 3 search results in common with the original user query. This computation is (iv) from step 350 (had at least one result. in common) over ii) of step 350 (result data existed for both original and altered queries).

frequently_altered 470 evaluates whether users occasionally try the substitution. Preferably, for every 2000 user queries, there is a corresponding altered query within the same session. This computation is (v) from 350 (appeared earlier within a session) over TDQ.

high_altering_ratio 480 measures whether users do not preferentially substitute in the opposite direction, i.e., substitute the phrase for the candidate synonym, which would suggest that the original phrase is much better than the candidate synonym. Preferably, for every user session in which the altered query is followed by the user query, there is at least one session in which the user query is followed by the altered query within a user session. This computation is (v) from step 350 (appeared earlier within a session) over (vi) from step 350 (appeared later within a session).

The following parameters are next computed based on the above tests: soft_and=frequently_alterable+2*frequently_much_in_common+0.5*frequently_altered+high_altering_ratio evidence=1.0-exp(-soft_and/1.5),
where exp is the natural exponential function, and soft_and reflects the totality of the test metrics.

The value of this variable evidence is a measure of the strength of or confidence in a synonym, qualified as discussed above. A value approaching 1.0 indicates very high confidence, while a value of 0.6 reflects good confidence. Depending on the application, greater or lesser confidence or strength can be required. Consequently, whether a candidate synonym is declared a validated synonym depends on the threshold value of evidence that is sufficient for the application. It has been empirically determined that for many applications, for example, a candidate synonym can be validated, e.g., considered equivalent to a phrase, if the value of evidence is greater than 0.6. Again, other thresholds and variations of the Scale function, and its subordinate functions may also be used.

A set of validated synonyms and the corresponding contexts in which they are effective can be utilized in several ways. A conservative approach is to suggest to the user alternative queries into which the synonym has been substituted. For example, when a user enters a given query, a number of alternative queries can be provided back to the user, along with the search results for the original query. Each of the alternative queries can be linked to its associated search results, so that the user does not have to manually re-enter the alternative query.

A more aggressive approach automatically treats the synonym as equivalent to the original phrase for purposes of document retrieval. This approach replaces a phrase with a disjunction of the latter and the synonyms. For example, "gm" would be replaced by "gm" OR "general motors." Alternatively, if the evidence for a synonym is relatively weak, the synonym can be used as suggestive rather than equivalent;

Advantages of the present invention include a computer implemented method to determine synonyms to serve as substitutions for phrases within an information search query. Candidate substitutions may be suggested to the user or automatically included in addition to or in place of the original query. Alternately, the candidate substitution may be used solely to modify the score associated with the retrieved documents. A formula may be used to assess the strength or quality of candidate synonyms, and the strength or quality may be compared to a threshold that is determined according to the application of interest.

Extensions

The preceding discussion described a generalized technique for discovering and generating context-sensitive synonyms. This technique is very useful, but it fails to take into account an important signal—lexical relationships between words. Consequently, the above-described technique misses many useful stems and other lexically similar words.

The following discussion remedies this problem by providing for special classes of highly-trusted synonyms which are lexically related to the original word. We treat these synonyms differently and try to be more inclusive of them in our data. These lexically related words can be categorized in various ways, but all share the trait of there being a lexical connection between the original word and the synonym:

(1) synonyms that share the same stem as the original word, according to a industry-standard lexical stemming technique (e.g. car→cars);

(2) synonyms that differ from the original word according to punctuation or spacing differences (e.g. "wood stock"→woodstock, albertsons→albertson's);

(3) synonyms that are acronyms of the original word/ phrase or vice versa. (e.g. VFW→veterans of foreign wars);

(3) synonyms that are similar according to a prefix-biased edit-distance technique;

(4) synonyms that are similar except for accenting on certain characters; and (5) synonyms that are abbreviations of each other (hrs→hours).

The following section discusses specific implementations that detect lexical relationships between two words, as well as a scheme to include this signal in synonym generation (as described above) and scoring their confidences that can be applied generally to anything that we deem is lexically similar.

First we describe specific mechanisms for establishing lexical similarity, and then we describe a general technique that can use these detection mechanisms.

Decompounding/Compounding

Query terms sometimes can be compound words composed of two or more subwords. We describe herein techniques for decompounding a compound query term online, when the query is received at search time, and for calculating a score of different ways of decompounding the compound query term. Then, based on the calculated scores one or more decompounded versions of the compound query term can be used as synonym(s) for the compound term when locating search results in response to the query that contains the compound term. This dynamic programming approach for de-compounding query terms at search time facilitates the generation of synonyms for terms that have not previously been encountered.

An initial step involves generating a dictionary of possible terms (e.g., words) that can occur in compound terms. Such a dictionary can be generated by computing the number of occurrences of each term in a corpus of documents (e.g., pages on the World Wide Web, a subportion of the Web, or pages in a corporate Intranet). Terms can be omitted from the dictionary if the terms do not occur more than a minimum number of times in the corpus of documents. Then, a score can be assigned to each term based on the frequency of the term in the corpus of documents. For example, the score for a term can be equal to, or based on, the logarithm of the frequency of the term, such that the more frequent the term is, the higher its score is. In an implementation, the scoring function can be adjusted by adding penalties for short words, rare words, or very common words, because such words tend to be relatively less helpful in identifying optimum decompounded subterms of a compound term. The scores associated with the words in the dictionary can be maintained in a storage location, e.g., on a physical computer readable storage medium, such as a magnetic or optical disk, or in a database or a table, etc.

After this initial step, then a dynamic programming approach is used at search time to rank different ways of splitting the compound term, so that compound term can be optimally de-compounded for use in a search query. In this approach, when a query is received, a query term can be split into constituent subterms that exist in the dictionary, and a score of the particular way the term is split can be determined based on the scores of the constituent subterms. A default score can be assigned to query terms that have not been encountered before. For example, the query term "vlcmediaplayer" may be split into two constituent subterms (e.g., "vlc" and "mediaplayer") or into three constituent subterms (e.g., "vlc" and "media" and "player"). In one implementation, the total score of a particular way of splitting the compound term can be equal to the sum of the scores of subterms. For example, when the term is split into the three subterms, "vlc" and "media" and "player," then the total score for that way of splitting the term can be determined by the equation, Total Score(vlc|media|player)=Score(vlc)+Score(media)+Score (player). When the term is split into the two subterms, "vlc" and "mediaplayer," then the total score for that way of splitting the term can be determined by the equation, Total Score (vlc|mediaplayer)=Score(vlc)+Score(mediaplayer). When the term is not split, and if the term does not exist in the dictionary, it can be assigned the default score.

In such a dynamic programming approach, in one implementation, a vector V with the size of the original compound query term is maintained with the property that V[k] keeps the best score for splitting the first k characters of the compound term having a length, L. Computing optimal value of V[k] can be found by considering only previous calculations of V[j] where j k, which makes this algorithm very efficient. For example, let us assume that the default score for "vlcmediaplayer" is 1 because the term did not exist in the dictionary, the score of "vlc" is 2, the score of "media" is 4, the score of "player" is 6, and the score of "mediaplayer" is 3. Then, the initial default score for "vlcmediaplayer" would equal to 1. As increasingly longer strings of characters are considered, the score of V[k] would be 1 for k<3, because the best split for k<3 would be to have no split at all. For 2<k<8, the score of V[k] would be equal to 2, because the only subterm found would be "vlc." For 7<k<14, the score of V[k] would be equal to 6 because the subterms found would be "vlc" and "media." For k=14, the score of V[k] would equal 12, because the subterms found would be "vlc," "media," "player" and "mediaplayer" and the sum of the scores for "vlc," "media," and "player" would equal 12, while the sum of the scores for "vlc" and "mediaplayer" would equal only 5. Thus, the score V[k]=12 for k=14 would represent a split of the term "vlcmediaplayer" into the three subterms "vlc," "media," and "player," which would have a higher score than the split into the two subterms "vlc" and "mediaplayer."

Performing this scoring online at search time, as opposed to generating a list of splits offline, allows the identification of compound words that have not previously been encountered, so that subterms in those compound words can be identified and used as synonyms for when serving search queries that include the compound term.

This technique can be further extended to identify the best N splits, where N>1, rather than only the split with the highest score. This can be accomplished by augmenting the data structure that is maintained to keep values V[k][b], which correspond to the $b^{th}$ best scores of splitting the first k characters. The best way of splitting the compound will correspond to V[length(V)][1], the second best way in V[length (V)][2] and so on. This extension is useful when several interpretations are possible and potentially useful. For example, for the compound query term "usedrugs" both the splits use|drugs and used|rugs can be useful.

A further extension is done by taking into account the so called fugenmorphemes. Many languages have grammatical constrains which require adding an extra letter between subwords when creating a compound word from the subwords. As an example in German, hochzeit (meaning wedding) and reise (meaning trip) can be combined to form the word hochzeitsreise (meaning honeymoon), i.e., with an "s" between the constituent subwords "hochzeit" and "reise." This means that when we try to split the compound word, the extra letter should be removed. We do this by maintaining a list of letters that can act as fugenmorphemes for different languages.

A final addition to improving the precision of these techniques is to maintain a list of exceptions for different languages. These exceptions are words that should not be used in splits because they usually do not mean anything. For example, the terms "keit" and "chen" are used as endings in German but do not have any particular meaning by themselves.

Once a compound query term has been decompounded and split into one or more possible combinations of subterms, the subterms of the compound query term in addition to compound query term itself, can be used to serve results for the query. For example, if a query containing the term "vlcmediaplayer" is received, then the split into the constituent subterms "vlc," "media," and "player," may be identified as the split having the highest score, and the split into the terms "vlc" and "mediaplayer," may be identified as the split having the next highest score. Based on the scores of the different possible splits, the group of subterms "vlc," "media," and "player," may be used as a synonym for the original compound query term "vlcmediaplayer," and search results may be identified and served based on the group of identified subterms, as well as based on the original compound query term "vlcmediaplayer." In an implementation, the group of subterms "vlc" and "mediaplayer" also can be used as a synonym for the compound query term "vlcmediaplayer," and additional search results may be identified and served based on the subterms "vlc" and "mediaplayer" that are used a synonym for the compound query term.

Figure 5:
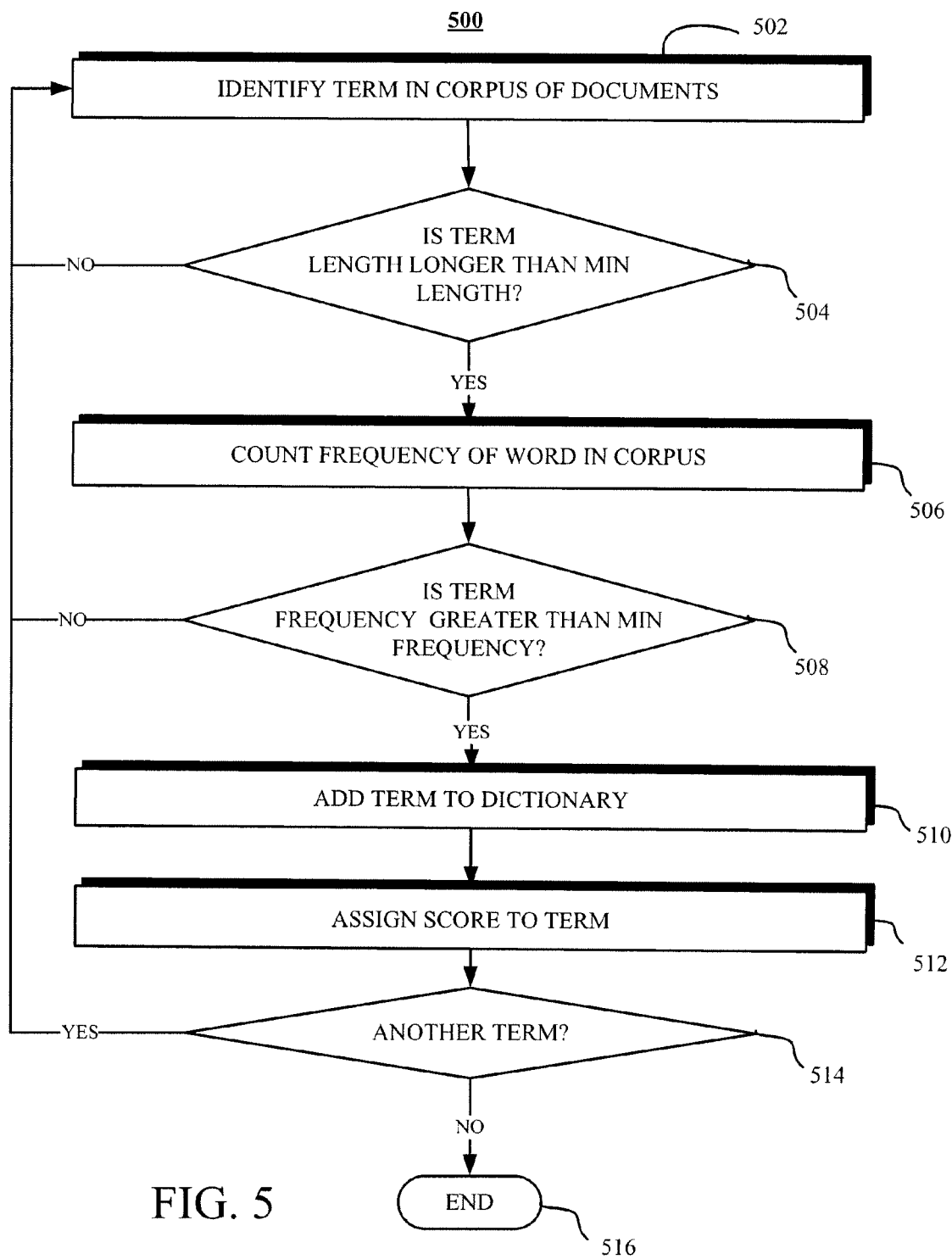
FIG. 5 presents a flowchart illustrating a process of identifying terms that can be used as subterms in compound terms and assigning scores to the subterms.

FIG. 5 presents a flowchart illustrating a process 500 of identifying terms that can be used as subterms in compound terms and assigning scores to the subterms. The process 500 begins by identifying a term in a corpus of documents (e.g., pages on the World Wide Web, a subportion of the Web, or pages in a corporate Intranet, etc.) (502). If the term has a length shorter than a minimum length (504), then the term is rejected and another term is considered. If the term has a length longer than the minimum length (504), then the frequency of the term in the corpus of documents is determined (506), and if the frequency is less than a minimum frequency (508), the term is rejected and another term is considered. If the frequency is greater than the minimum frequency (508), the term is added to a list or dictionary or words (510). A score is assigned to the term in the dictionary, where the score can be based on the frequency of the term in the corpus of documents (512). For example, a baseline score for the term can be equal to the log of the frequency of the term in the corpus, and the baseline score may be adjusted by other factors such as weight that depends on the length of the term. Then, another term in the corpus can be considered (514), but when all terms in the corpus have been considered, then the process can end (516).

Figure 6:
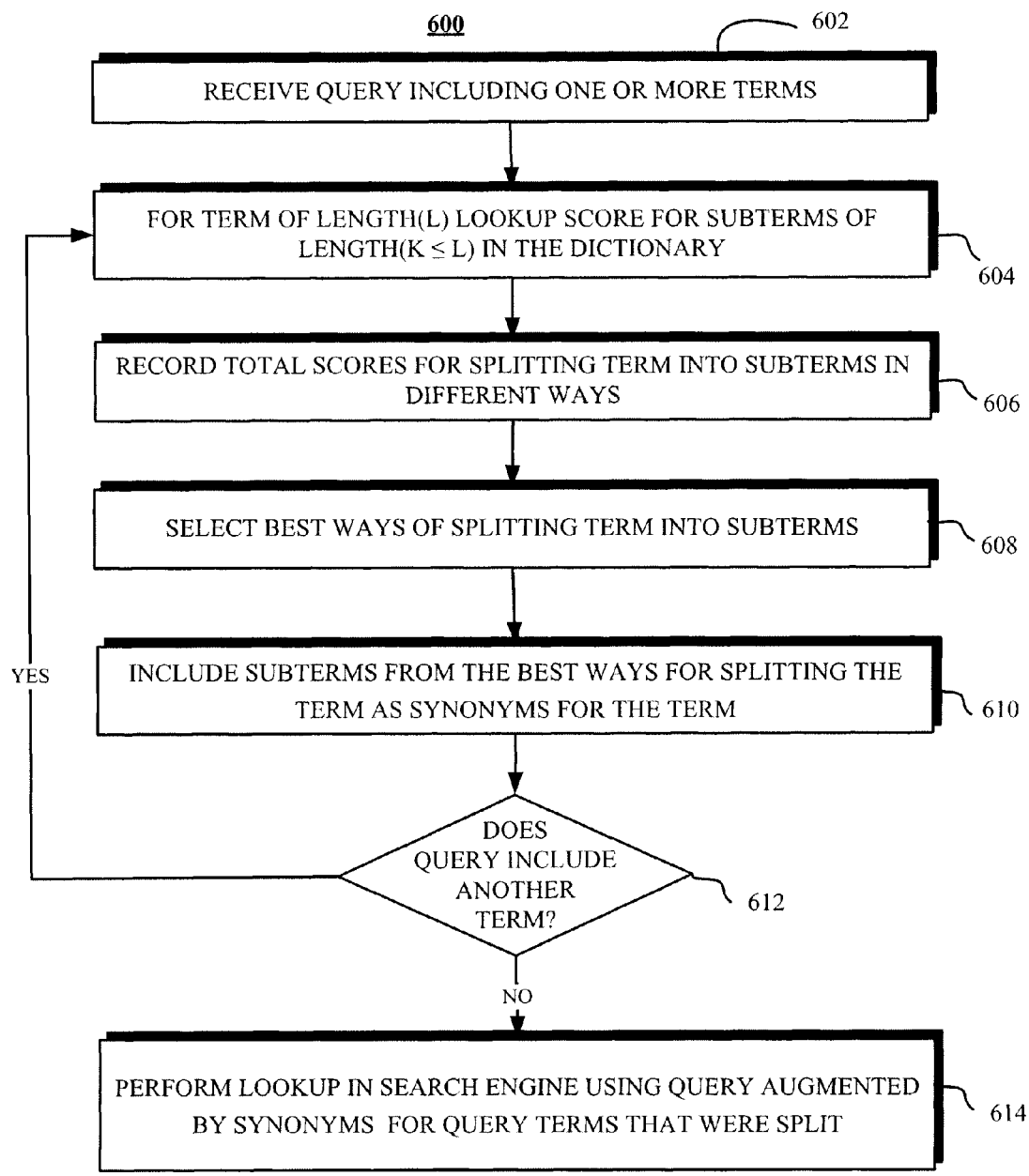
FIG. 6 presents a flowchart illustrating a process of splitting compound query terms into constituent subterms and calculating a score for the split, so that subterms can be used as synonyms for the compound query term when responding to search queries.

FIG. 6 presents a flowchart illustrating a process 600 of splitting compound query terms into constituent subterms and calculating a score for the split, so that subterms can be used as synonyms for the compound query term when responding to search queries. In the process 600 a query is received that includes one or more terms (602). For a term of having a length of k characters, scores of potential subterms of length j<k can be looked up in the dictionary (604). To promote efficiency, potential subterms having a length below a minimum length or above need not be considered. Scores for subterms that exist in the query term and that have a non-zero score are buffered, and then total scores for different possible ways of splitting the term into multiple subterms are recorded (606). The way(s) of splitting the query term having the highest score(s) is/are then selected as the best way(s) of splitting the term into subterms (608), and the subterms from the best way(s) of splitting the query terms are then included as synonyms for the term (610). If the query includes another term (612), then possible subterms of that term are considered, but if no more query terms exist then a search engine can use the original query augmented by the subterm synonyms to retrieve results in response to the query (614).

Acronym Synonyms

If one of the words is a single word, we run a standard editdistance procedure to align the original word and the phrase. If a substantial number or fraction of the characters in the single word align with the first letters of the synonym phrase (or vice versa), we detect this as an acronym. In addition, we also collect the first characters of all the words in the phrase and run the editdistance procedure again against the single word. If they are sufficiently similar (e.g. we allow only maxlength*0.25 edits), we deem it an acronym. An alternate but simpler implementation might be to simply check that all characters in the word align with the first character of each word in the phrase. For example, in the first implementation, consider the acronym NASA→"National Aeronautic and Space Administration". We would extract from the phrase "NAASA" and try to align that with "NASA". There would be one edit (the edition of an "A"). The maximum length of both strings is 5, so 1/5=0.20 is below our 0.25 edit-distance threshold. The edit-distance threshold is not fixed, but could be set based on empirical measurements.

Pseudostems

One problem with standard stemming techniques is that they typically aim to be conservative because in the past they have been used to identify stems without the help of any additional signals. Our intent in identifying lexical variants is to use this as just one signal in a system that already produces high quality synonyms and stems.

Therefore, we developed a "pseudostemming" technique that is fairly aggressive compared to conventional stemmers. It works as follows. First, if the original word and the candidate synonym differ by 1 edit, we conclude it's a pseudostem. Otherwise, we use a sequence of tests: First we compute the length of the common prefix the two words share. In one embodiment of the present invention, we require that the number of characters of matching prefix divided by the maximum length of either string be greater than some threshold. For example, for "shuttler" and "shuttling", the common prefix is "shuttl", of length 5. The max length is 9, so the ratio is 5/9, which is 0.56. An empirically determined threshold can be 0.5, so this first test passes.

After the first test, we examine the leftover parts of both words after the common prefix. In the above example, that would be "er" from "shuttler" and the string "ing" from "shuttling". We calculate the edit distance between the leftovers. In this case, that would be an edit distance of 3 (using a character mismatch cost of 1).

We can also require that this edit distance of the leftover components be less than some fraction of the max length of both strings. For example, the maximum length in the present example is 9, and our current fraction threshold is 0.4, so this is 0.4*9=4.4. An edit distance of 3 is <4.4, so in this case, the leftover edits would also pass this test. Since these two tokens pass both second tests, we declare them to be pseudostems.

Diacriticals

Finally, in many non-English languages the use of diacritical marks and accents are extremely common. We can strip these marks off with both language-specific and universal de-accenting. If the words are equal after stripping, they classify as lexical variants. In addition to doing this to the original words, we also do this stripping and input the stripped versions of the words to all of the above techniques. This allows us to catch the case where, for example, a character may be accented in the phrase for an acronym, but is not accented in the acronym itself. Similarly, this means that comparing an accented to unaccented character does not count as an edit in the pseudo-stemming or other techniques.

Gender/Number Stemming Detection

Using linguistic rules that are specific to each language, it is possible to develop a classifier that says that one word is a "conservative" stemming variant of another.

Abbreviations

Many people use abbreviations or short-hands for words. For example, "hours" can be written as "hrs" or "people" as "ppl". We detect abbreviations by stripping all vowels from both words, running a standard minimum edit-distance technique, and making sure that the number of edits between the stripped words is small compared to the maximum length of both words. For example, stripping vowels from "hours" we get "hrs". We compute the edit distance between "hrs" and "hrs", which is 0. The maximum length is 3 characters, so the ratio is 0/3, or 0.0. This ratio is less than an acceptable edit-distance threshold, which is empirically determined. (For point of reference, it is currently 0.25)

The above hodgepodge of techniques should not be considered exhaustive. We can use the above techniques and also standard stemming techniques to identify trusted lexical synonyms. In particular, we can use the Lovins and Porter stemmers, but other stemmers are known to those trained in the art and could be suitable replacements.

Using Lexical Similarity Detection in a Synonym Generation System

Note that we previously discussed how we used various signals to verify that a word is indeed a synonym. We can extend this technique to cover lexical synonyms. In one embodiment of the present invention, determining whether a word is a synonym involves considering: (1) a common result requirement, which specifies how frequently common query results should be produced when the word is substituted with the synonym in a query; and (2) a session switching requirement, which specifies how often a user switched the word with the synonym in a given session.

Note that the common result frequency and the session switching frequency provide a rough estimate of how closely the original word and the synonym are semantically related. Because the above detectors for lexical synonyms give us a stronger belief that the words are semantically related, we can lower our requirements for common results and for session switching for these classes of synonyms. Note that we can determine how far to lower these requirements empirically.

We found empirically that acronyms, compounds, and decompounds tend to have quite different results and sometimes have low session switching, so one embodiment of the present invention requires no common results for such lexical variants. Also, for compounds and decompounds and punctuation variants we can use ⅓ of the requirement for session switching as compared to general synonyms. This is because compounds and simple punctuation variants almost always mean the same thing, so we trust whatever evidence we have.

For pseudostems, stems, general number stems, and abbreviations we can trade-off a high session switching rate and a high frequency of occurrence of queries with the substitution anywhere in the logs for a decreased common results requirement. In one embodiment, this includes a high threshold on session switching and the appearance anywhere in the logs (outside of sessions) of the synonym, which then triggers a lower threshold on common results. One could also create a different embodiment that trades the signals with an appropriate mixing function, which is approximated by the threshold in the embodiment above.

The above specify schemes that are specific to each lexical type in one embodiment of this invention, but one skilled in the art could recognize alternate schemes, such as categorizing the types into trust levels, symbolized by a number. This number could be used to modulate an aggressivity function for mixing signals that could be equivalent to the above embodiment.

Using Lexical Similarity to Highlight Synonyms in Search Result Snippets

The above techniques provide a way for recognizing lexically similar synonyms when generating synonym data. In addition to this process, we also use these methods as a filter to decide to highlight the synonym in search result snippets, similar to how we highlight original query terms.

Identification of Synonyms Through Transitive Relationships

In addition to the techniques described above for identifying two phrases as synonyms directly on the basis of a related usage of the two phrases, phrases can be identified as synonyms of each other based on transitive relationships between the phrases, even when the phrases are not identified directly as synonyms on the basis of a related usage. Thus, if the phrase "B" is identified as a good synonym of the phrase "A" (e.g., on the basis of a related contextual usage of the phrases A and B), and if the phrase "C" is identified as a good synonym of the phrase "B" (e.g., on the basis of a related contextual usage of the phrases B and C), then C can be identified as a good synonym of A through the property of transitivity. Such a technique facilitates the discovery and identification of a third phrase as a synonym of a first phrase even if the phrases are not identified as synonyms directly based on a comparison of queries having the first phrase with queries having the third phrase or based on a comparison of results of queries having the first phrase with queries having the third phrase. Thus, by using the transitive properties of synonyms, new synonym candidates can be identified, and the use of synonyms to respond to queries can be expanded.

For example, in the query "configuring a linksys router," the word "configure" may be identified as a synonym for the word "configuring" on the basis of a shared stem, and the word "setup" may be identified as a synonym of "configure" based on a related contextual usage of "setup" and "configure" in certain queries. Then, based on this information alone, "setup" may be identified as a good synonym for "configuring" based on the transitive property that because "setup" and "configure" are synonyms, and because "configure" and "configuring" are synonyms, then "setup" and "configuring" are also synonyms. This process can be extended to N levels by considering additional synonyms for the word "setup," and synonyms of those synonyms, and so on, and identifying all such phrases to be synonyms for the original word, "configuring."

Various constraints can be applied to the identification of synonyms through transitivity. For example, a candidate synonym phrase can be accepted or rejected as a synonym based on a confidence level that the phrase is applicable as a synonym, or how frequently the word occurs in the specific language. Likewise, once the new synonyms have been identified, there can be different approaches for incorporating them into the query response system, such as giving them more or less ability to impact search results.

Another example of the use of transitive properties can be observed from a consideration of the German-language query term "laserdruckerpatrone," meaning "laser printer cartridge." If "laserpatrone" is identified as a good synonym of "laserdruckerpatrone," and if "toner" is identified as a good synonym of "laserpatrone," on the basis of a contextual usage of those two terms in queries, then "toner" may be identified as a good synonym of "laserdruckerpatrone."

Furthermore, transitivity can be used in the context of compound words to identify synonyms. For example, for a compound word AB, if B' is a synonym of B, then AB' can be identified as good synonym of AB. As an example, consider again the term "laserdruckerpatrone." This word can be decompounded into the sub-compounds "laser," "drucker," and "patrone," or alternatively, "laser" and "druckerpatrone." Then, if "patrone" is identified as a as a synonym of "druckerpatrone," by substituting "patrone" as a synonym for "druckerpatrone" in the original term "laserdruckerpatrone," "laserpatrone" can be identified as a synonym for "laser-druckerpatrone."

Figure 7:
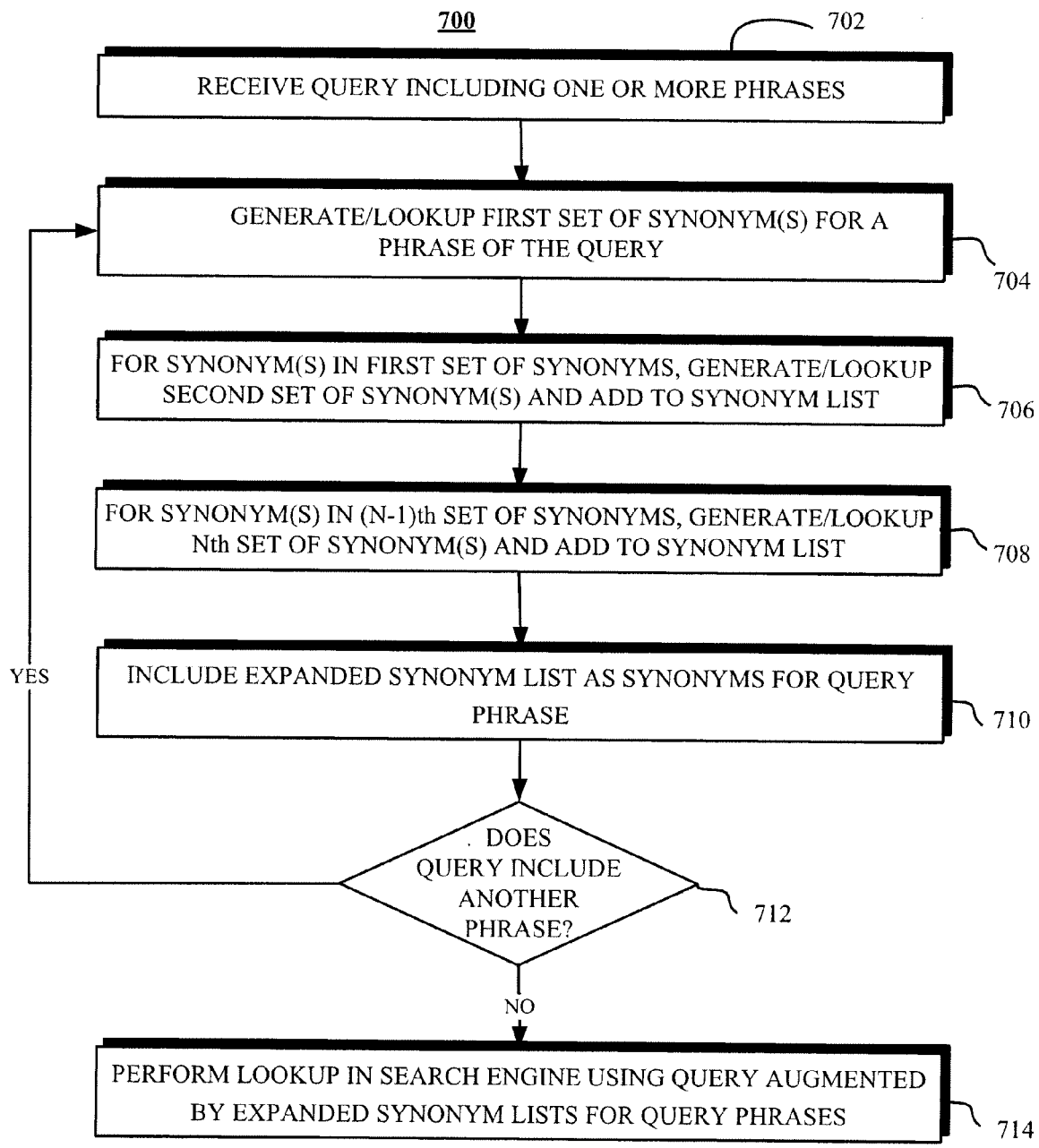
FIG. 7 presents a flowchart illustrating a process of identifying a first phrase and a third phrase as synonym phrases based on transitive relationships between the first phrase and a second phrase that is synonym of a first phrase and between the third phrase and a second phrase that is synonym of a third phrase.

FIG. 7 presents a flowchart illustrating a process 700 of identifying a first phrase and a third phrase as synonym phrases based on transitive relationships between the first phrase and a second phrase that is synonym of a first phrase and between the third phrase and a second phrase that is synonym of a third phrase. In the process 700, a query that includes one or more phrases is received (702). A phrase of the query is identified, and synonyms for the phrase are identified either by looking up the synonyms in a pre-defined table or by generating the synonyms (704). One or more of the synonym phrases can be identified as a synonym of the query phrase based on a comparison of queries having the query phrase with queries having the synonym phrase or based on a comparison of results of queries having the phrase with queries having the synonym phrase. These synonym phrases can constitute a first set of synonym phrases. Then, additional phrases can be identified as synonyms of the phrase(s) in the first set (706) (e.g., based on a comparison of queries having a phrase from the first set with queries having a one of the additional phrases or based on a comparison of results of queries having a phrase from the first set with queries having one of the additional phrases). These additional synonym phrases can constitute a second set of synonyms and can be added to the synonym list for the query phrase. This process can be repeated to N levels. For example, a third set of synonym phrases can be looked up or generated, where the third set of phrases are synonyms of phrases in the second set of phrases, and the third set of phrases can be added to the synonym list for the query phrase, and a fourth set of synonym phrases can be looked up or generated, where the fourth set of phrases are synonyms of phrases in the second set of phrases, and the fourth set of phrases can be added to the synonym list for the query phrase, and so on, up to the Nth set of phrases (708). The process step 708 can be cut off at a predetermined Nth degree, or when no more synonyms are identified, or when the number of identified synonyms falls below a threshold, or when the number of identified synonyms increases above a threshold value, or some other criterion. Then, synonyms that have been identified through steps 706 and 708 can be included a synonym list for the query phrase (710).

Next, a decision is made whether the query contains another phrase (712). If so, the process 700 returns to step 704 to identify synonyms for the next phrase of the query, and then to identify additional synonyms of the synonyms, and add the additional synonyms to a synonym list for the next phrase of the query. If the query contains no more phrases, then a search engine looks up results for the query using the original query terms, augmented by the expanded synonym lists of phrases of the query.

Identification of Synonyms Through Decompounding and Transitive Relationships

Figure 8:
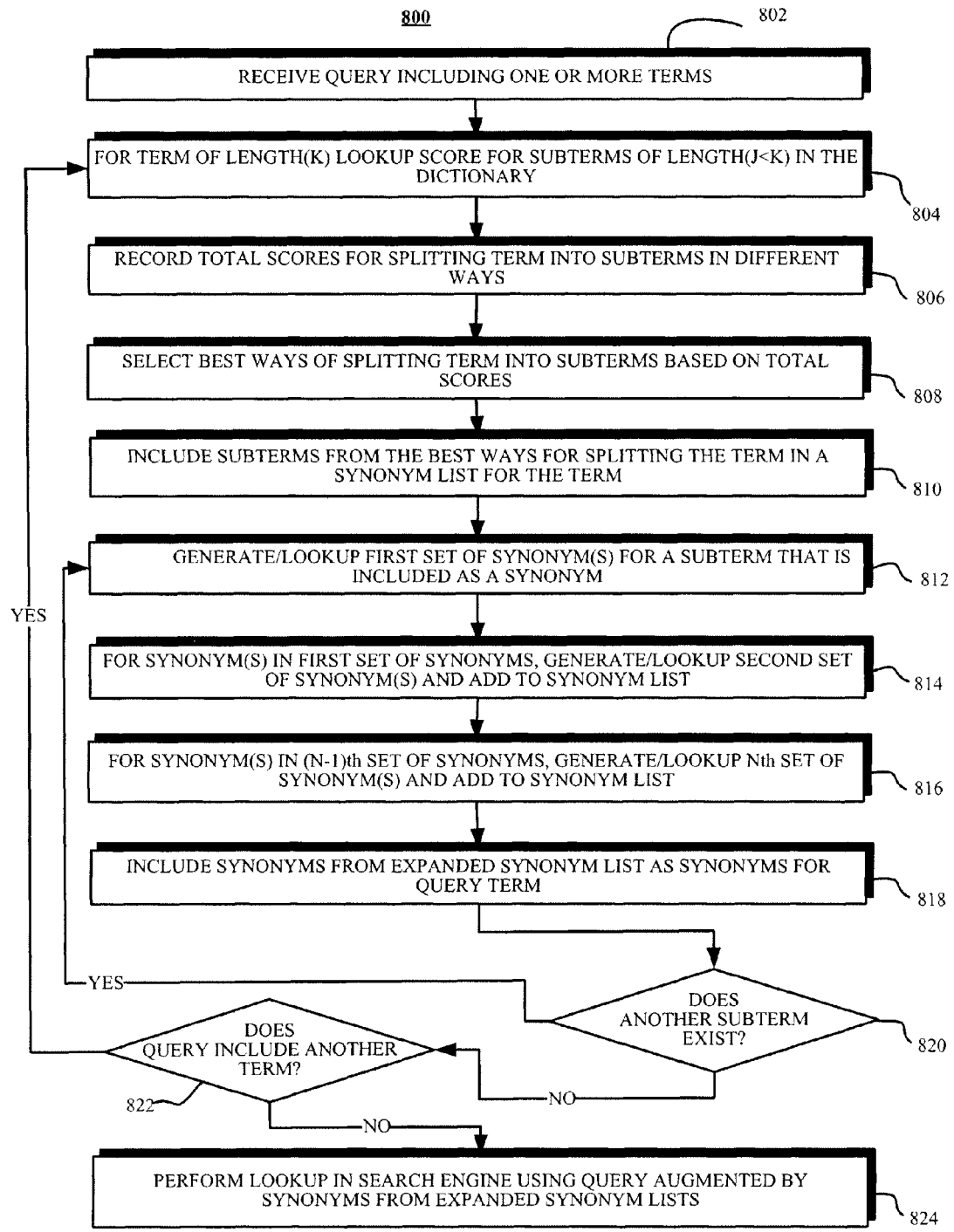
FIG. 8 presents a flowchart illustrating a process of identifying synonym phrases for compound query terms.

FIG. 8 presents a flowchart illustrating a process 800 of identifying synonym phrases for compound query terms, which combines the techniques for identifying synonyms through decompounding and the techniques for identifying synonyms through transitive relationships described above. In the process a query containing one or more terms is received (800). For a term of having a length of k characters, scores of potential subterms of length j<k can be looked up in a dictionary (804). Scores for subterms that exist in the query term and that have a non-zero score are buffered, and then total scores for different possible ways of splitting the term into multiple subterms are recorded (806). The way(s) of splitting the query term having the highest score(s) is/are then selected as the best way(s) of splitting the term into subterms (808), and the subterms from the best way(s) of splitting the query terms are then included as synonyms for the term (810). A first set of synonyms for one of the subterms then can be generated or looked up and included as synonyms for the compound query term (812). Then, additional phrases can be identified as synonyms of the terms in the first set (814). These additional synonym terms can constitute a second set of synonyms and can be added to the synonym list for the query phrase. As described above, this process can be repeated to N levels (816). Then, synonyms that have been identified through steps 812-816 can be included a synonym list for the compound query term (818). If another subterm of the compound query exists (820) then additional synonyms can be identified for that subterm by returning to step 812. If no more subterms for that query exist (820), then if another term in the query exists (822) that term can be decompounded by returning to the process at step 804 and synonyms for the decompounded subterms can be identified. If no more query terms exist (822) then a search engine can retrieve results for the query using the original query terms, augmented by the expanded synonym lists of terms of the query.

Alternatives

There are a number of alternatives to the above-described techniques. One might use different stemmer techniques to decide that tokens share the same stem. One might also use slightly different edit-distance techniques or a slightly different pseudostem filter (instead of using max length of strings, use average length, for example). One might use the lexical signals to modulate synonym generation differently. Instead of using a different threshold for trusted lexical synonyms, we might rate the level of trust and divide some base threshold by trust.

The present invention has been described in particular detail with respect to one or more possible implementations. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented through a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing"

or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A system comprising:
   one or more processors; and
   a computer-readable storage device storing instructions that, when executed by the one or more processors, cause the one or more processors to perform operations comprising receiving a query submitted by a user to a search engine, wherein the query includes a first compound term; and
   in response to receiving the query, performing the following operations:
   generating one or more splits of the first compound term, wherein each split divides the compound term into two or more subterms, wherein at least one subterm is a term in a dictionary that associates terms with scores derived from a respective frequency of use of the subterm;
   assigning a score to one or more subterms of each split that are in the dictionary, wherein the score for a subterm is the score stored in the dictionary for the subterm;
   determining an overall score for each split from the scores for the subterms of the split;
   selecting one or more of the one or more splits according to the overall score for each split; and
   augmenting the query with the subterms of each selected split.

2. The system of claim 1, wherein selecting one or more of the plurality of splits according to the overall scores comprises selecting the split with a highest overall score.

3. The system of claim 1, wherein selecting one or more of the plurality of splits according to the overall scores comprises selecting N splits with the N highest scores, wherein N is greater than one.

4. The system of claim 1, wherein generating one or more splits of the first compound term comprises incrementally analyzing prefixes of increasing length of the first compound term to identify subterms of the prefix that appear in the dictionary.

5. The system of claim 1, wherein the operations further comprise receiving a list of fugenmorphemes for a first language corresponding to a language of the first compound, wherein each fugenmorpheme is a letter that is added between subterms when creating a compound term in the first language, wherein at least one of the one or more splits omits a fugenmorpheme on the list of fugenmorphemes from the subterms of the split.

6. The system of claim 1, wherein each subterm for a first split in the plurality of splits is a term in the dictionary.

7. The system of claim 1, wherein one subterm for a first split in the plurality of splits is a term in the dictionary, and another subterm for the first split is not in the dictionary.

8. The system of claim 1, wherein the score for a subterm of a split is a default score if the subterm is not in the dictionary.

9. The system of claim 1, wherein the score associated with each term in the dictionary is derived from a frequency with which the term is used in a corpus of documents.

10. The system of claim 1, wherein the score associated with each term in the dictionary is derived from a logarithm of the frequency of use of the term.

11. The system of claim 1, wherein the score associated with each term in the dictionary is reduced if the term is less than a threshold length.

12. The system of claim 1, wherein the score associated with each term in the dictionary is reduced if the term is used with more than a threshold frequency.

13. The system of claim 1, wherein the score associated with each term in the dictionary is reduced if the term is used with less than a threshold frequency.

14. The system of claim 1, wherein determining an overall score for each split from the scores for the subterms of the split comprises summing the scores for the subterms of the split.

15. The system of claim 1, wherein the operations further comprise maintaining a list of subterms that should not be used in splits.

16. The system of claim 1, wherein the operations further comprise providing search results responsive to the augmented query to the user.

17. A non-transitory computer-readable storage device storing instructions that, when executed by data processing apparatus, cause the data processing apparatus to perform operations comprising:
    receiving a query submitted by a user to a search engine, wherein the query includes a first compound term; and
    in response to receiving the query, performing the following operations:
        generating one or more splits of the first compound term, wherein each split divides the compound term into two or more subterms, wherein at least one subterm is a term in a dictionary that associates terms with scores derived from a respective frequency of use of the subterm;
        assigning a score to one or more subterms of each split that are in the dictionary, wherein the score for a subterm is the score stored in the dictionary for the subterm;
        determining an overall score for each split from the scores for the subterms of the split;
        selecting one or more of the one or more splits according to the overall score for each split; and
        augmenting the query with the subterms of each selected split.

18. The non-transitory computer-readable storage device of claim 17, wherein selecting one or more of the plurality of splits according to the overall scores comprises selecting the split with a highest overall score.

19. The non-transitory computer-readable storage device of claim 17, wherein selecting one or more of the plurality of splits according to the overall scores comprises selecting N splits with the N highest scores, wherein N is greater than one.

20. The non-transitory computer-readable storage device of claim 17, wherein generating one or more splits of the first compound term comprises incrementally analyzing prefixes of increasing length of the first compound term to identify subterms of the prefix that appear in the dictionary.

21. The non-transitory computer-readable storage device of claim 17, wherein the operations further comprise receiving a list of fugenmorphemes for a first language corresponding to a language of the first compound, wherein each fugenmorpheme is a letter that is added between subterms when creating a compound term in the first language, wherein at least one of the one or more splits omits a fugenmorpheme on the list of fugenmorphemes from the subterms of the split.

22. The non-transitory computer-readable storage device of claim 17, wherein each subterm for a first split in the plurality of splits is a term in the dictionary.

23. The non-transitory computer-readable storage device of claim 17, wherein one subterm for a first split in the plurality of splits is a term in the dictionary, and another subterm for the first split is not in the dictionary.

24. The non-transitory computer-readable storage device of claim 17, wherein the score associated with each term in the dictionary is derived from a frequency with which the term is used in a corpus of documents.

25. The non-transitory computer-readable storage device of claim 17, wherein the score associated with each term in the dictionary is derived from a logarithm of the frequency of use of the term.

26. The non-transitory computer-readable storage device of claim 17, wherein the score associated with each term in the dictionary is reduced if the term is less than a threshold length.

27. The non-transitory computer-readable storage device of claim 17, wherein the score associated with each term in the dictionary is reduced if the term is used with more than a threshold frequency.

28. The non-transitory computer-readable storage device of claim 17, wherein the score associated with each term in the dictionary is reduced if the term is used with less than a threshold frequency.

29. The non-transitory computer-readable storage device of claim 17, wherein determining an overall score for each split from the scores for the subterms of the split comprises summing the scores for the subterms of the split.

30. The non-transitory computer-readable storage device of claim 17, wherein the operations further comprise maintaining a list of subterms that should not be used in splits.

31. The non-transitory computer-readable storage device of claim 17, wherein the operations further comprise providing search results responsive to the augmented query to the user.

32. A computer implemented method, comprising:
    receiving a query submitted by a user to a search engine, wherein the query includes a first compound term; and
    in response to receiving the query, performing the following operations before search results responsive to the query are identified:
        generating one or more splits of the first compound term, wherein each split divides the compound term into two or more subterms, wherein at least one subterm is a term in a dictionary that associates terms with scores derived from a respective frequency of use of the subterm;
        assigning a score to one or more subterms of each split that are in the dictionary, wherein the score for a subterm is the score stored in the dictionary for the subterm;
        determining an overall score for each split from the scores for the subterms of the split;
        selecting one or more of the one or more splits according to the overall score for each split; and
        augmenting the query with the subterms of each selected split.

33. The method of claim 32, wherein generating one or more splits of the first compound term comprises incrementally analyzing prefixes of increasing length of the first compound term to identify subterms of the prefix that appear in the dictionary.

34. The method of claim 32, wherein selecting one or more of the plurality of splits according to the overall scores comprises selecting the split with a highest overall score.

35. The method of claim 32, wherein selecting one or more of the plurality of splits according to the overall scores comprises selecting N splits with the N highest scores, wherein N is greater than one.

36. The method of claim 32, wherein the operations further comprise receiving a list of fugenmorphemes for a first language corresponding to a language of the first compound, wherein each fugenmorpheme is a letter that is added between subterms when creating a compound term in the first language, wherein at least one of the one or more splits omits a fugenmorpheme on the list of fugenmorphemes from the subterms of the split.

37. The method of claim 32, wherein each subterm for a first split in the plurality of splits is a term in the dictionary.

38. The method of claim 32, wherein one subterm for a first split in the plurality of splits is a term in the dictionary, and another subterm for the first split is not in the dictionary.

39. The method of claim 32, wherein the score for a subterm of a split is a default score if the subterm is not in the dictionary.

40. The method of claim 32, wherein the score associated with each term in the dictionary is derived from a frequency with which the term is used in a corpus of documents.

41. The method of claim 32, wherein the score associated with each term in the dictionary is derived from a logarithm of the frequency of use of the term.

42. The method of claim 32, wherein the score associated with each term in the dictionary is reduced if the term is less than a threshold length.

43. The method of claim 32, wherein the score associated with each term in the dictionary is reduced if the term is used with more than a threshold frequency.

44. The method of claim 32, wherein the score associated with each term in the dictionary is reduced if the term is used with less than a threshold frequency.

45. The method of claim 32, wherein determining an overall score for each split from the scores for the subterms of the split comprises summing the scores for the subterms of the split.

46. The method of claim 32, wherein the operations further comprise maintaining a list of subterms that should not be used in splits.

47. The method of claim 32, wherein the operations further comprise providing search results responsive to the augmented query to the user.

* * * * *